(12) United States Patent
Lair (10) Patent No.: US 6,976,352 B2
(45) Date of Patent: Dec. 20, 2005

(54) TOGGLE INTERLOCKED THRUST REVERSER

(75) Inventor: Jean-Pierre Lair, San Antonio, TX (US)

(73) Assignee: The NORDAM Group, Inc., Tulsa, OK (US)

( * ) Notice: Subject to any disclaimer, the term of this patent is extended or adjusted under 35 U.S.C. 154(b) by 127 days.

(21) Appl. No.: 10/802,889

(22) Filed: Mar. 16, 2004

(65) Prior Publication Data

US 2005/0039438 A1 Feb. 24, 2005

Related U.S. Application Data

(60) Provisional application No. 60/478,163, filed on Jun. 13, 2003, and provisional application No. 60/456,710, filed on Mar. 22, 2003.

(51) Int. Cl.⁷ ................................................. F02K 3/02
(52) U.S. Cl. ................... 60/226.2; 60/230; 244/110 B; 239/265.37; 239/265.25
(58) Field of Search ............................... 60/226.2, 230; 244/110 B; 239/265.25, 265.37, 265.39

(56) References Cited

U.S. PATENT DOCUMENTS

| | | | |
|---|---|---|---|
| 3,503,211 A | | 3/1970 | Medawar et al. |
| 3,614,037 A | | 10/1971 | Vdolek |
| 3,739,582 A | * | 6/1973 | Maison ...................... 60/226.2 |
| 3,764,096 A | * | 10/1973 | Wright .................... 244/110 B |
| 3,779,010 A | | 12/1973 | Chamay et al. |
| 3,829,020 A | | 8/1974 | Stearns |
| 4,922,712 A | | 5/1990 | Matta et al. |
| 5,655,360 A | | 8/1997 | Butler |
| 5,779,192 A | | 7/1998 | Metezeau et al. |
| 5,826,823 A | | 10/1998 | Lymons et al. |
| 5,913,476 A | | 6/1999 | Gonidec et al. |
| 5,987,880 A | * | 11/1999 | Culbertson ................... 60/204 |
| 6,151,884 A | * | 11/2000 | Gonidec et al. ........... 60/226.2 |
| 6,568,172 B2 | | 5/2003 | Jannetta et al. |

* cited by examiner

Primary Examiner—Charles G. Freay
(74) Attorney, Agent, or Firm—Francis L. Conte (57) ABSTRACT

A fan thrust reverser includes a nacelle having radially outer and inner skins. An outer door is disposed in the outer skin, and mounted to the nacelle at a hinge joint. A toggle link is pivotally joined between the outer door and the nacelle for latching stowed the outer door in the nacelle. An actuator is provided for rotating the outer door about the hinge joint for deploying the door outwardly from the nacelle and toggling off the toggle link, and stowing inwardly the outer door upon reverse rotation thereof and toggling on the toggle link to latch the door stowed in the nacelle.

22 Claims, 12 Drawing Sheets

FIG. 16

TOGGLE INTERLOCKED THRUST REVERSER

This application claims the benefit of U.S. Provisional Applications 60/456,710; filed Mar. 22, 2003; and 60/478,163; filed Jun. 13, 2003.

BACKGROUND OF THE INVENTION

The present invention relates generally to aircraft engines, and, more specifically, to thrust reversers therein.

A typical turbofan aircraft engine includes a fan powered by a core engine for producing propulsion thrust for powering the aircraft in flight. The core engine typically has in serial flow communication a multistage axial compressor, annular combustor, and high pressure turbine joined to the compressor by one shaft. A second shaft joins the fan to a low pressure turbine disposed downstream from the high pressure turbine.

The engine also includes a fan nacelle surrounding the cowling or nacelle of the core engine which defines an annular bypass duct therebetween. The nacelle may be short and terminates in a fan outlet nozzle surrounding the core engine upstream from an independent core exhaust nozzle at the downstream end thereof. Or, the fan nacelle may be long and extends downstream past the core nozzle for collectively discharging both the fan bypass air and the core exhaust in a common exhaust nozzle disposed downstream therefrom.

The turbofan engine typically also includes a fan thrust reverser for providing aerodynamic braking during aircraft landing on a runway. Various types of fan thrust reversers are known in the art, one of which includes pivoting doors that block the aft travel of the fan air in the bypass duct and redirect it in the forward direction for reversing the direction of fan air thrust.

The known fan reversers have various advantages and various disadvantages relating to complexity, size, weight, and cost. And, the pivoting door fan reverser requires redundant locking or latching devices for preventing inadvertent in-flight deployment thereof.

In a large turbofan engine, there may be four pivoting doors spaced around the nacelle, with each of those four doors requiring three independent latches for satisfying government certification requirements. Accordingly, twelve independent latches would be required for the entire fan reverser, and correspondingly increase the complexity and cost of the reverser system and its control.

U.S. patent application Ser. No. 10/679,882; filed Oct. 6, 2003, and assigned to the present assignee, discloses an improved bifold door thrust reverser having many advantages over typical fan thrust reversers. The bifold door reverser includes outer and inner doors which are deployed in opposition for blocking and turning the fan bypass flow during thrust reverse operation. A gang of the outer doors may be deployed in unison with a common inner door, all deployed using a common actuator.

The outer and inner doors maintain continuity of the outer and inner skins of the nacelle when stowed, and the actuation mechanism is fully contained in the nacelle between the two skins. The bifold door reverser is relatively compact and requires relatively small stroke of the actuators used therein.

And, the compact and nested configuration of the outer and inner doors in the bifold door reverser permit therein the introduction of a new locking or latching system as further described hereinbelow.

BRIEF SUMMARY OF THE INVENTION

A fan thrust reverser includes a nacelle having radially outer and inner skins. An outer door is disposed in the outer skin, and mounted to the nacelle at a hinge joint. A toggle link is pivotally joined between the outer door and the nacelle for latching stowed the outer door in the nacelle. An actuator is provided for rotating the outer door about the hinge joint for deploying the door outwardly from the nacelle and toggling off the toggle link, and stowing inwardly the outer door upon reverse rotation thereof and toggling on the toggle link to latch the door stowed in the nacelle.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
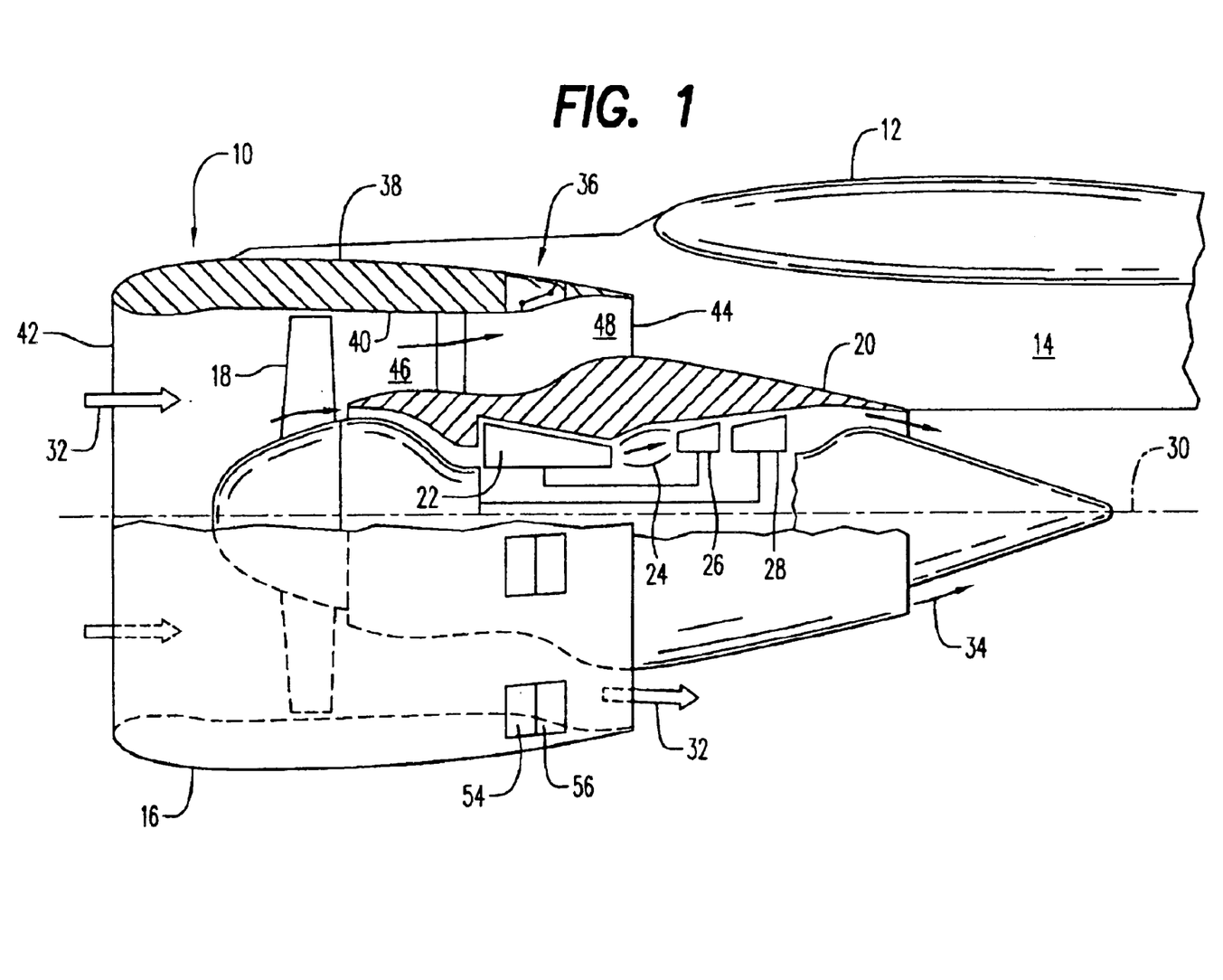
FIG. 1 is a partly sectional axial view of an exemplary turbofan aircraft gas turbine engine mounted to an aircraft wing, and including a fan thrust reverser integrated in the fan nacelle thereof.

Illustrated in FIG. 1 is a turbofan aircraft gas turbine engine 10 suitably mounted to the wing 12 of an aircraft by a supporting pylon 14. Alternatively, the engine could be mounted to the fuselage of the aircraft if desired.

The engine includes an annular fan nacelle 16 surrounding a fan 18 which is powered by a core engine surrounded by a core nacelle or cowl 20. The core engine includes in serial flow communication a multistage axial compressor 22, an annular combustor 24, a high pressure turbine 26, and a low pressure turbine 28 which are axisymmetrical about a longitudinal or axial centerline axis 30.

During operation, ambient air 32 enters the fan nacelle and flows past the fan blades into the compressor 22 for pressurization. The compressed air is mixed with fuel in the combustor 24 for generating hot combustion gases 34 which are discharged through the high and low pressure turbine 26,28 in turn. The turbines extract energy from the combustion gases and power the compressor 22 and fan 18, respectively.

A majority of the air is pressurized by the driven fan 18 for producing a substantial portion of the propulsion thrust powering the aircraft in flight. The combustion gases 34 are exhausted from the aft outlet of the core engine for providing additional thrust.

However, during landing operation of the aircraft, thrust reversal is desired for aerodynamically slowing or braking the speed of the aircraft as it decelerates along a runway. Accordingly, the turbofan engine 10 includes a fan thrust reverser 36 wholly contained in or integrated into the fan nacelle 16 for selectively reversing fan thrust during aircraft landing.

The fan thrust reverser, or simply fan reverser 36 is integrated directly into the fan nacelle 16. The fan nacelle includes radially outer and inner cowlings or skins 38,40 which extend axially from a leading edge of the nacelle defining an annular inlet 42 to an opposite trailing edge defining an annular outlet 44. As additionally shown in FIGS. 2 and 3, the fan nacelle 16 may have any conventional configuration, and is typically formed in two generally C-shaped halves which are pivotally joined to the supporting pylon 14 for being opened during maintenance operations.

The exemplary fan nacelle illustrated in FIGS. 1–4 is a short nacelle terminating near the middle of the core engine for discharging the pressurized fan airflow separately from and surrounding the exhaust flow 34 discharged from the aft outlet of the core engine. In alternate embodiments, the fan nacelle could be long and extend downstream of the core engine for providing a single, common outlet for both the fan air and the core exhaust.

In the exemplary embodiment illustrated in FIG. 1, the core engine is mounted concentrically inside the fan nacelle 16 by a row of supporting struts in a conventional manner. The core cowl 20 is spaced radially inwardly from the inner skin 40 of the fan nacelle to define an annular bypass duct 46 therebetween which bypasses a major portion of the fan air around the core engine during operation. The fan bypass duct terminates in an annular fan nozzle 48 at the nacelle trailing edge or outlet 44.

A particular advantage of the fan reverser 36 is that the fan nozzle 48 itself may remain fixed at the aft end of the fan nacelle surrounding the core engine. And, the fan reverser 36 may be fully integrated in the fan nacelle immediately forward or upstream from the fixed fan nozzle.

Figure 5:
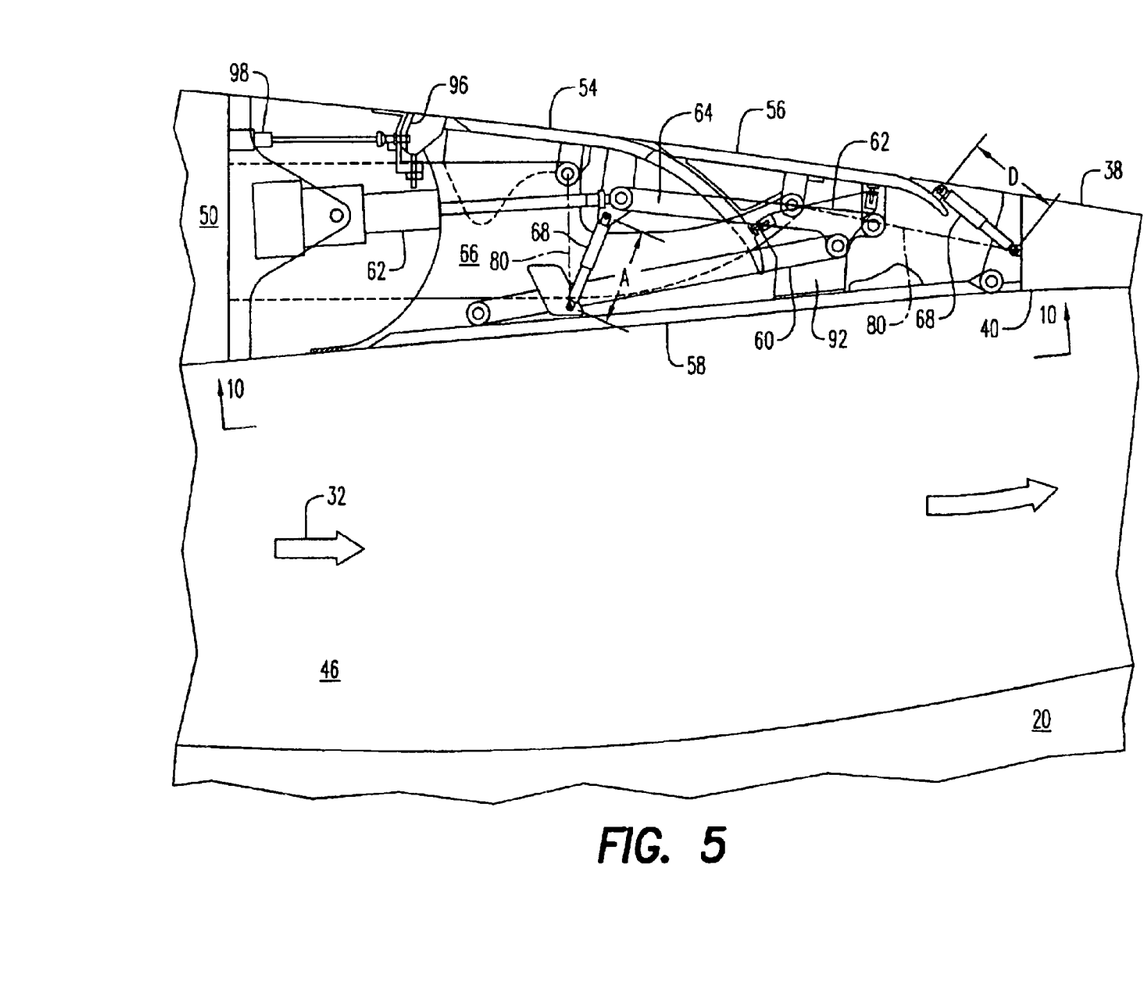
FIG. 5 is an axial sectional view of the fan reverser illustrated in FIGS. 1–4 in a stowed position.
Figure 6:
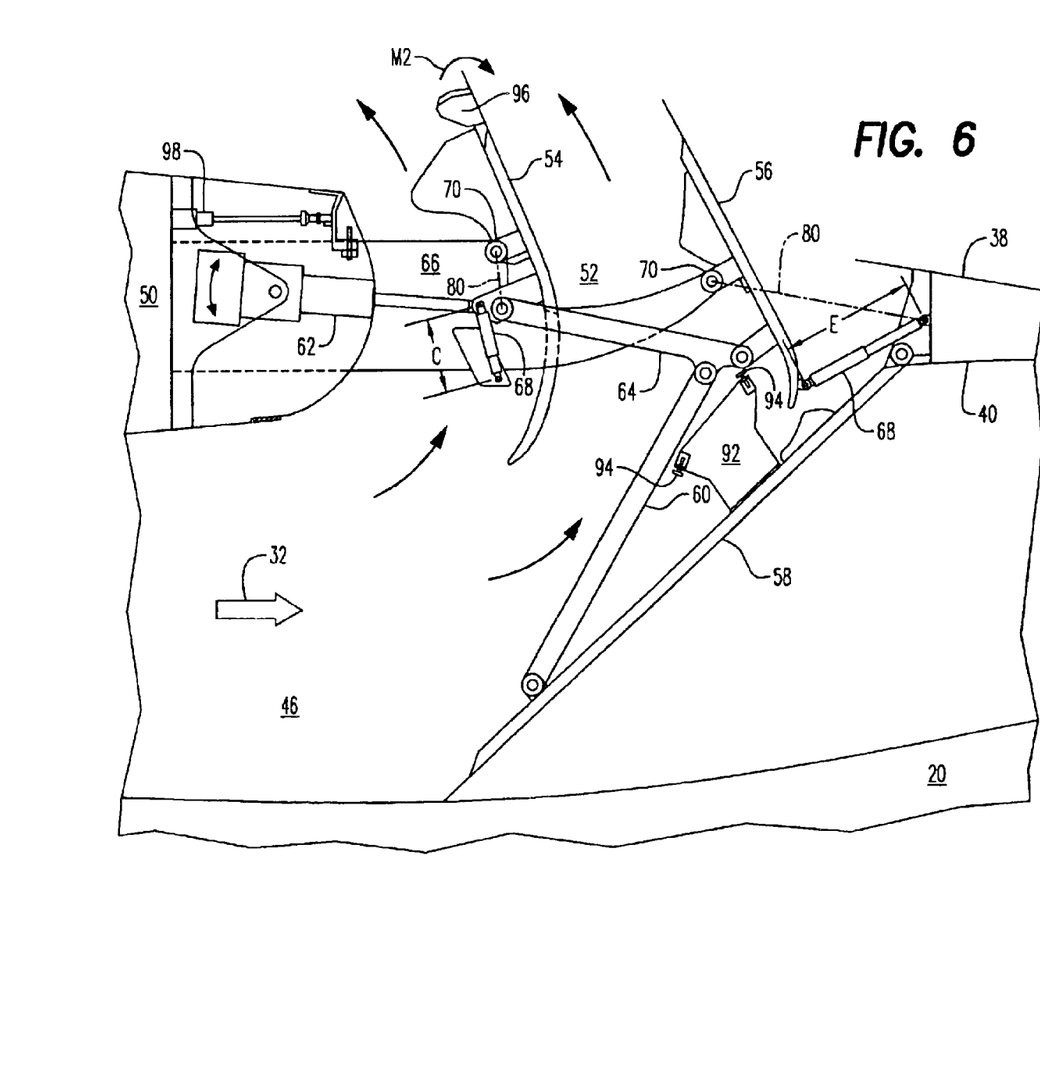
FIG. 6 is an axial sectional view of the fan reverser illustrated in FIG. 5 shown in a deployed position.

More specifically, the fan reverser is illustrated in more detail in FIGS. 5 and 6 wherein the outer and inner skins 38,40 are spaced radially apart to define an arcuate compartment or annulus 50 spaced axially forwardly from the nacelle trailing edge 44. The nacelle compartment 50 includes a flow tunnel or aperture 52 extending radially between the inner and outer skins through which the pressurized fan bypass air 32 may be discharged during thrust reverse operation.

At least one, and preferably a gang or set of radially outer louver doors 54,56 are suitably pivotally joined to the fan nacelle in the compartment 50 to close the exit end of the tunnel along the outer skin 38. Two or more of the louver doors may be axially nested together as further described hereinbelow.

A corresponding radially inner reverser or blocker door 58 is suitably pivotally joined to the fan nacelle 16 inside the compartment 50 in radial opposition with the gang of louver doors to close the inlet end of the tunnel along the inner skin 40. In the stowed closed position illustrated in FIG. 5, the inner door is folded closed generally parallel with the corresponding gang of outer doors, converging slightly to conform with the converging profile or cross section of the nacelle.

Figure 2:
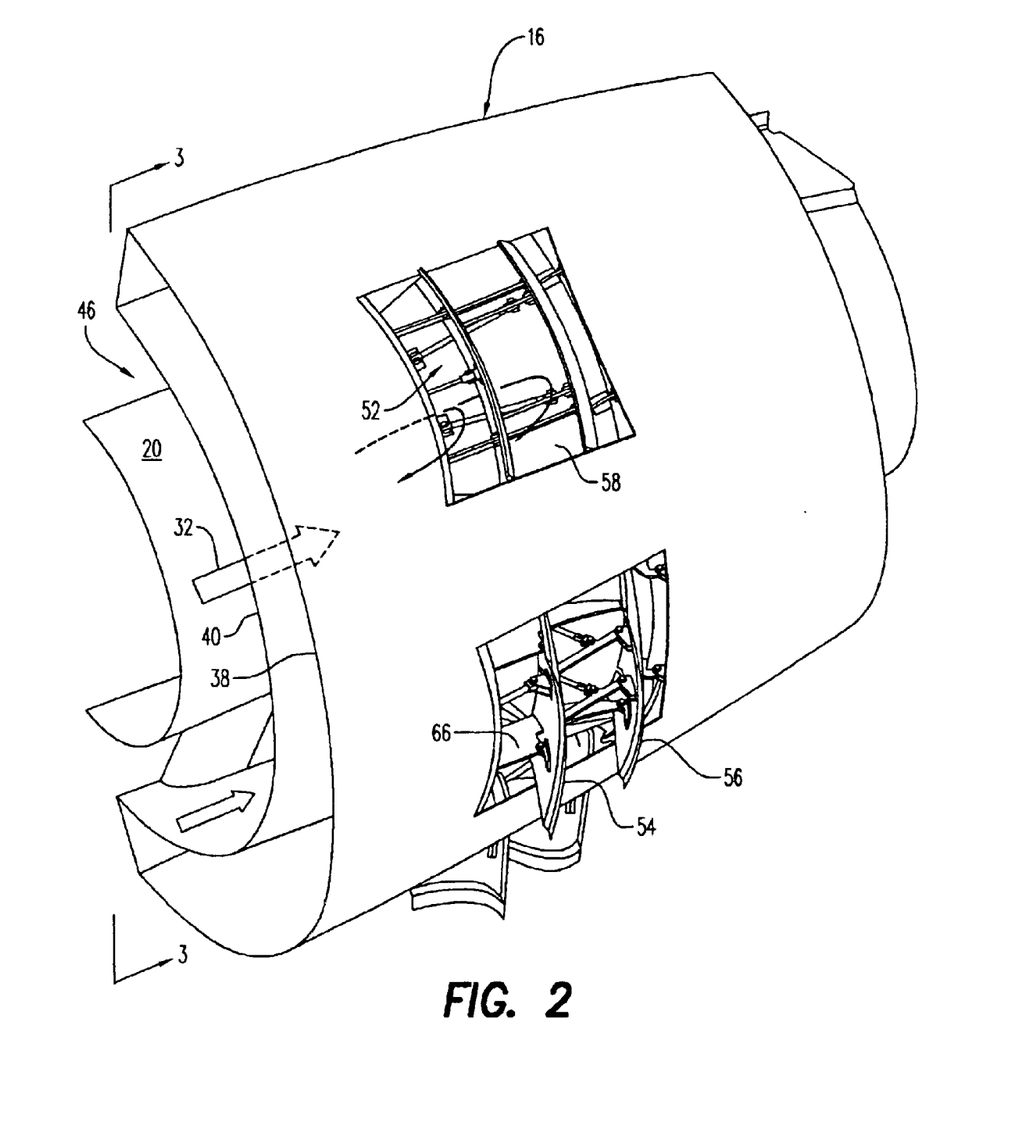
FIG. 2 is an isometric view of a symmetrical half of the fan nacelle shown in FIG. 1 illustrating deployment of the fan thrust reverser therein.
Figure 3:
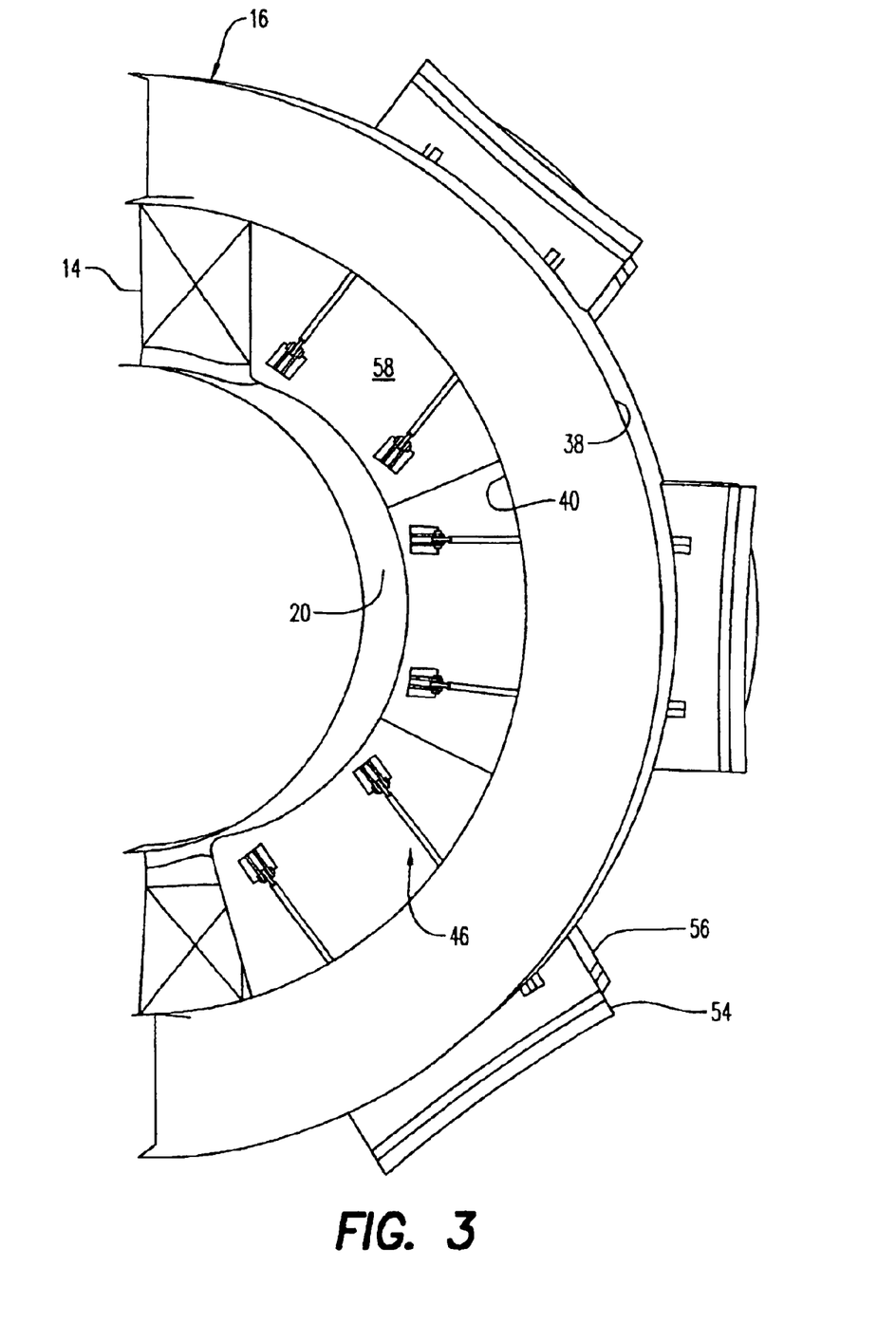
FIG. 3 is a radial sectional view of the nacelle illustrated in FIG. 2 and taken generally along line 3—3.

Since the fan bypass duct 46 illustrated in FIGS. 1–3 is substantially annular, the fan reverser includes corresponding groups of the louver doors 54,56 and cooperating blocker door 58 spaced circumferentially apart around the perimeter of the fan nacelle 16. For example, in each half C-duct portion of the fan nacelle, three groups of the blocker and louver doors are uniformly spaced apart from each other.

The three blocker doors 58 in each nacelle half preferably have trapezoidal configurations for circumferentially adjoining each other inside the inner skin 40 when deployed as illustrated in FIG. 3 for blocking the fan flow from exiting through the fan nozzle. Instead, the fan flow is diverted through the open louver doors as illustrated in FIG. 2 and directed axially forwardly for providing thrust reverse operation in landing of the aircraft.

An elongate drive link 60 pivotally joins together the outer and inner doors for coordinating the simultaneous deployment thereof. Means in the form of a linear drive actuator 62 are suitably mounted in the nacelle compartment and joined to the doors for selective rotation thereof from the stowed position illustrated in FIG. 5 at which the doors are pivoted closed substantially flush in the outer and inner skins 38,40 respectively.

For example, in FIGS. 5 and 6, the drive actuator 62 is pivotally joined to the fan nacelle in a suitable cradle inside the reverser compartment 50, and the output rod thereof is directly pivotally joined to the middle of the forward louver door 54. In this way, the output rod of the actuator 62 is unconstrained to move with the forward louver door 54 as it rotates between the deployed and stowed positions.

The actuator 62 may be operated in reverse for rotating the doors to the deployed position illustrated in FIG. 6 at which the outer doors 54,56 are pivoted open and extend radially outwardly in part from the outer skin 38, with the inner door 58 being pivoted open and extending radially inwardly in most part from the inner skin 40. The outer and inner doors are interconnected by the drive link 60 in an accordion or bifold manner in which the doors collapse or fold together in the stowed position illustrated in FIG. 5, and swing open with opposite inclinations in the deployed position illustrated in FIG. 6.

The bifold configuration of the outer louver doors and inner blocker door permits all the components of the fan reverser to be integrated and hidden within the axial extent of the radial compartment 50 between the outer and inner skins. The doors 54–58, the drive link 60, and the drive actuator 62 are fully contained within the compartment in the stowed position illustrated in FIG. 5 without any flow obstruction by these reverser components inside the inner skin 40 of the nacelle.

In this way, the inner skin 40 including the stowed blocker door 58, maintains a substantially smooth and flush inner boundary or flow contour of the fan nacelle surrounding the bypass duct 46 for maintaining aerodynamic efficiency of the fan air discharged therethrough without obstruction. And, the outer skin 38 including the stowed louver doors 54,56 remains substantially smooth and flush for minimizing aerodynamic drag as the engine propels the aircraft at altitude.

In the preferred embodiment illustrated in FIGS. 5 and 6, a pair of the outer louver doors 54,56 are arranged in axial series in the common flow tunnel 52 in axial and circumferential alignment atop the common blocker door 58 disposed therebelow. An elongate unison link 64 pivotally joins together the gang of louver doors 54 so that they may open and close simultaneously in the manner of commonly known louver windows.

The common drive link 60 pivotally joins together the gang of louver doors and the complementary blocker door 58. The drive actuator 62 may then be used for deploying outwardly in unison the louver doors as the cooperating blocker door is simultaneously deployed inwardly. In this way, the one set of blocker and louver doors may be deployed simultaneously as the doors unfold from each other, with the louver doors being inclined radially outwardly and facing forwardly, and the blocker door being inclined radially inwardly and forwardly in the deployed position illustrated in FIG. 6.

The louver doors 54,56 illustrated in FIGS. 4–7 are configured for multiple purposes including smoothly closing the flow tunnel in the outer skin 38 when the louvers are stowed closed. And, when deployed open, the louver doors are inclined radially outwardly and forwardly for reversing direction of the fan bypass flow 32 for fan thrust reversal, while additionally turning the airflow through the flow tunnel.

Correspondingly, the inner blocker door 58 illustrated in FIG. 6 may be deployed radially inwardly into the bypass duct 46 in unfolding or bifold opposition with the outer louver doors 54,56. The blocker door 58 is suitably sized in axial length to radially reach the core cowl 20 when deployed. The blocker door therefore bridges the entire radial extent of the bypass duct 46 for blocking and diverting the fan bypass flow 32 radially outwardly into the oppositely inclined open louver doors which redirect the bypass flow axially forwardly for thrust reverse operation.

Figure 4:
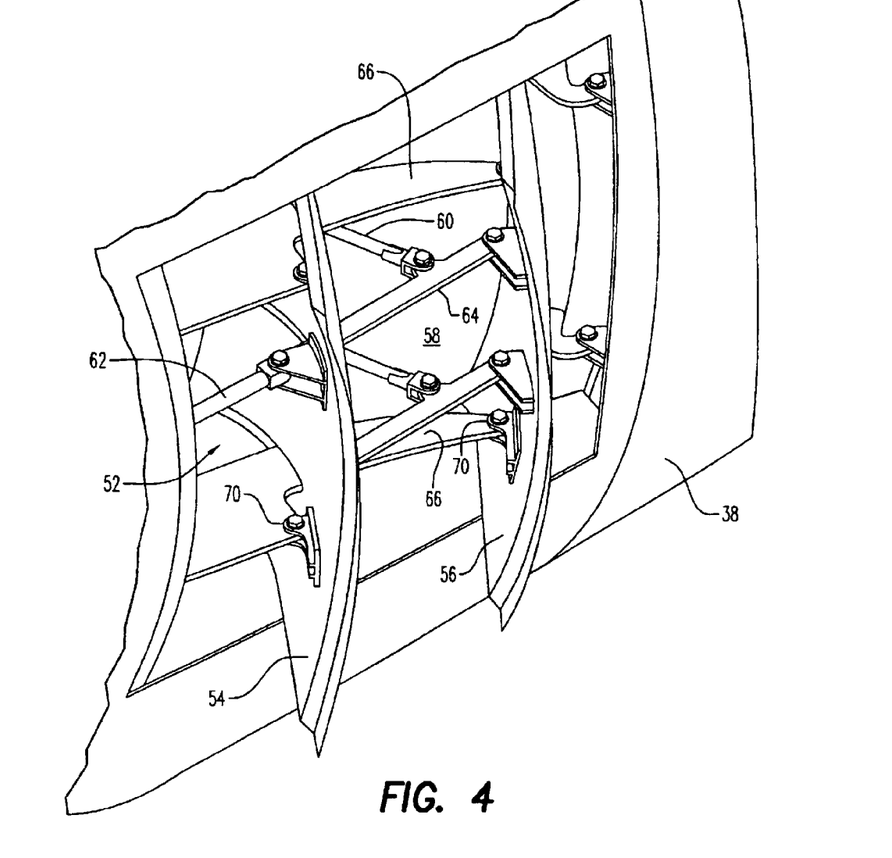
FIG. 4 is an enlarged isometric view of a representative set of the reverser doors illustrated in FIG. 2 in an exemplary embodiment.

The louver doors 54,56 and blocker door 58 may be suitably mounted to the fan nacelle in any convenient manner for effecting the improved deployment thereof as described above. For example, a pair of circumferentially spaced apart cantilevers 66 have corresponding proximal ends which are suitably fixedly mounted to the nacelle in the common compartment 50. The cantilevers are preferably thin beams circumferentially and thick radially to provide sufficient strength for supporting the louver doors therefrom while minimizing obstruction of the airflow during thrust reverse operation. As shown in FIG. 4, the two cantilevers 66 define with the two deployed louver doors a grate like those typically found in fixed cascade vanes, but using the movable louver doors.

The aft louver door 56 is suitably pivotally joined to the distal ends of the two cantilevers, with the forward louver door 54 being pivotally joined at an intermediate location on the cantilevers forward of the aft distal end thereof. In this way, the thin cantilevers support the louver doors under tension against the aerodynamic pressure loads exerted on the louver doors when deployed.

In FIGS. 4–6, a pair of the unison links 64 are correspondingly mounted to the louver doors 54,56 axially along respective ones of the two cantilevers 66. And, two corresponding drive links 60 extend from the aft ends of the unison links to the forward ends of the blocker doors.

The output rod of the pivoted actuator 62 may then be conveniently mounted to a suitable clevis at the middle of the forward louver door 54 between the two cantilevers as illustrated in FIG. 4. Deployment of the forward louver door in turn deploys the aft louver door and the common blocker door interconnected by the pairs of unison links 64 and drive links 60.

The various pivotal connections or joints required for the louver and blocker doors, actuating links, and drive actuator may be provided in any conventional manner. For example, suitable clevis brackets may be fixedly joined to the doors as illustrated in FIGS. 10–14 for pin mounting to the cantilevers, links, and corresponding internal frames in the nacelle.

In the preferred embodiment illustrated in FIGS. 4, 6, 12, 13 the unison link 64 is pivotally joined to the two louver doors 54 in corresponding devises thereon mounted in the louver doors aft of the devises which pivotally join the louver doors to the cantilevers in the nacelle. In this way, the various components of the actuating means may be fully contained within the nacelle compartment 50 for efficiently kinematically opening and closing the doors in unison.

In the preferred embodiment illustrated in FIG. 6, the drive link 60 is pivotally joined between the aft end of the unison link 64 and the forward end of the blocker door 58. In this way, as the unison link is deployed aft in the nacelle, the drive link opens inwardly the attached blocker door which pivots at its aft end. Correspondingly, retraction forwardly of the unison link retracts outwardly the drive link and the attached blocker door to the stowed position illustrated in FIG. 5.

In FIG. 5, extension of the actuator rod in turn pushes aft the unison link 64 for pivoting closed the louver doors on their respective pivot joints while also pivoting closed the interconnected blocker door. In FIG. 6 the actuator rod is retracted forwardly which in turn pulls the unison link 64 forwardly for pivoting open the two louver doors around their respective pivot axes while driving radially inwardly the drive link for opening the blocker door.

Although extension of the actuator 62 illustrated in FIG. 5, and the internal pressure of the fan bypass flow 32 cooperate to maintain closed the blocker and louver doors, it is also desirable to provide a further mechanism for locking closed the doors of the thrust reverser.

More specifically, the interconnected bifold configuration of the louver doors 54,56 and the cooperating blocker door 58 permits the introduction of a relatively simple mechanism for self-locking or self-latching the cooperating doors in their stowed positions without the need for external power or control dedicated thereto. This self-locking capability is effected by introducing one or more substantially identical toggle links 68 suitably pivotally joined between one or both louver doors 54,56 and the supporting nacelle 16 as illustrated in FIGS. 5 and 6, for example. Each toggle link is preferentially joined to the corresponding louver door for biasing or latching stowed in the closed position that louver door flush in the outer skin of the nacelle. The toggle link works in combination with the drive actuator 62 as it deploys open and stows closed the louver doors.

Figure 7:
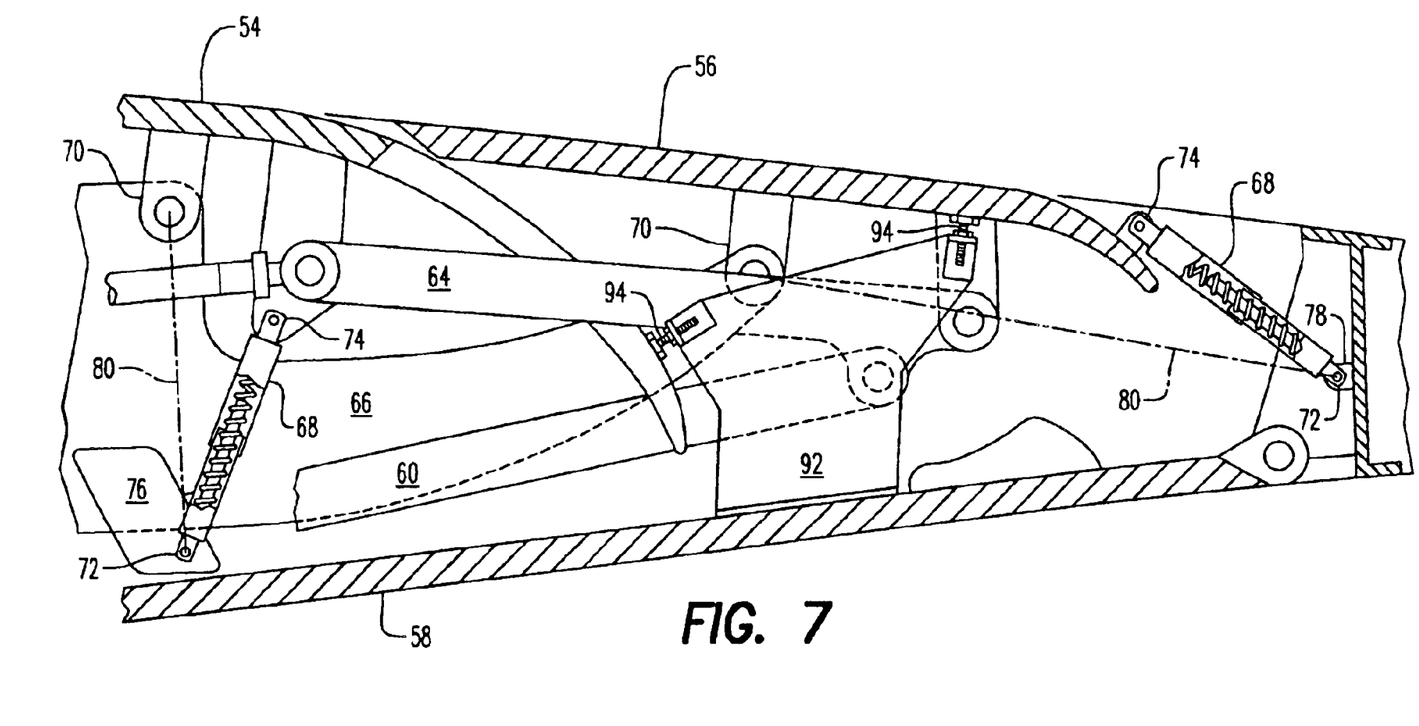
FIG. 7 is an enlarged axial sectional view through an aft portion of the fan reverser illustrated in FIG. 5 showing a pair of toggle links in accordance with an exemplary embodiment.

FIG. 7 illustrates in enlargement the hinge mounting of the two louver doors 54,56 to the supporting cantilevers 66.

Each louver door includes a suitable hinge joint 70 formed with the cantilevers 66 by corresponding hinge pins extending therethrough. Each joint may include a suitable clevis fixedly mounted to the inboard surface of the louver doors in which the thin cantilever is disposed and pivotally secured thereto by a hinge pin.

In this way, each of the louver doors as illustrated in FIG. 6 may be rotated open or rotated closed by the interconnected output rod of the drive actuator 62 when desired. The corresponding toggle link 68 may be used in conjunction with rotation of the louver doors for providing a biasing force to maintain closed the louver doors in their stowed positions.

Figure 8:
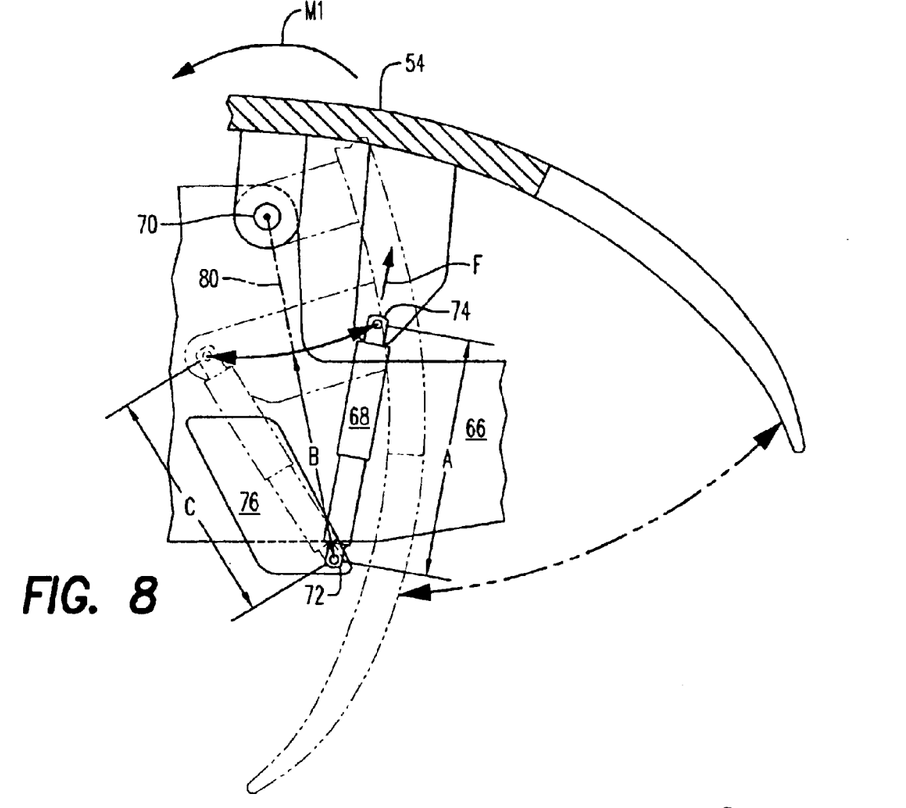
FIG. 8 is an enlarged view of the mounted forward toggle link illustrated in FIG. 7.

The two exemplary toggle links 68 illustrated in FIG. 7 may be identical in configuration, but suitably different in size and orientation for cooperating with the two louver doors 54,56. FIG. 8 is a further enlarged view of the forward toggle link 68 attached to the forward louver door 54, and is representative also of the aft toggle link similarly attached to the aft louver door 56 illustrated in FIG. 7.

As illustrated in FIG. 8, the toggle link 68 includes a proximal end 72 pivotally joined to the supporting nacelle and spaced away from the hinge joint 70, and an opposite distal end 74 disposed generally therebetween.

In FIG. 7, the proximal end of the forward toggle link may be pivotally joined to a bracket 76 fixedly joined to the bottom of the cantilever 66. Correspondingly, the proximal end of the aft toggle link may be pivotally joined to another bracket 78 fixedly mounted to an adjacent frame in the nacelle.

The proximal ends of the two toggle links illustrated in FIG. 7 are suitably spaced away from the corresponding hinge joints 70 to define corresponding, straight toggle lines or centerlines 80 therebetween.

For each toggle link, the opposite distal end 74 thereof is disposed between its proximal end 72 and the corresponding hinge joint 70 laterally offset or off-center from the corresponding toggle line 80 as illustrated in both FIG. 7 and 8.

For the forward toggle link 68 illustrated in FIGS. 6 and 7, its distal end 74 is laterally offset axially aft in the outboard direction of the forward toggle line 80 in the stowed position of the forward louver door 54, and oppositely laterally offset axially forwardly in the inboard direction of the forward toggle line in the deployed position of the forward louver door. In other words, the toggle link 68 toggles between the opposite sides of the toggle line 80 relative to the corresponding hinge axis 70 of the forward louver door 54.

Correspondingly, for the aft toggle link illustrated in FIGS. 6 and 7, the distal end 74 thereof is laterally offset radially outwardly in the outboard direction of the aft toggle line 80 in the stowed position of the door, and oppositely laterally offset radially inwardly of the aft toggle line in the deployed position of the aft louver door. The aft toggle link 68 therefore similarly toggles between the opposite sides of the aft toggle line 80 between the stowed and deployed positions of the aft louver door 56.

The forward and aft toggle links 68 are illustrated schematically in FIGS. 6–8, and are preferably telescopic and vary in length as they are toggled during operation. The toggle links are suitably configured for requiring increasing compression force as their lengths decrease between their opposite proximal and distal ends.

Figure 9:
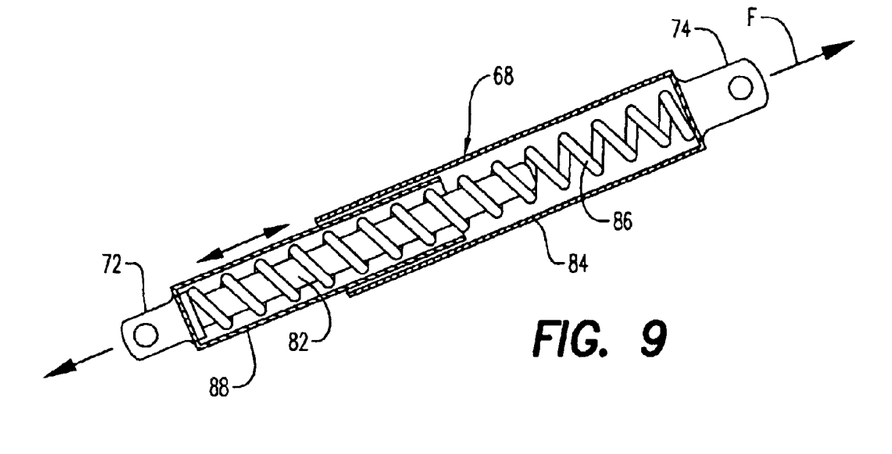
FIG. 9 is an isolated view of the toggle link in accordance with an exemplary embodiment.

FIG. 9 illustrates an exemplary embodiment of the two toggle links 68. Each link may include an elongate rod extending from the proximal end 72 which is correspondingly received inside an elongate cylinder 84 fixedly joined to the distal end 74. A compression spring 86 surrounds the rod 82 inside the cylinder 84, and effects a reaction force F in response to the compression of the toggle link that decreases its length as the spring is compressed inside the cylinder. A suitable tubular shield or casing 88 surrounds the spring from the proximal end 72 and telescopes inside the cylinder 84 during compression and expansion of the toggle link during use.

In alternate embodiments, the toggle link 68 may be pneumatic or hydraulic, instead of using the compression spring therein, for introducing the reaction force to compression thereof in any conventional manner.

As illustrated in FIGS. 5 and 8, the forward toggle link 68 has a first length A between its opposite proximal and distal ends in the stowed position of the forward louver door. As the forward louver door 54 is rotated from its stowed position in FIG. 8 to its deployed position in FIG. 6, the distal end 74 of the link is forced by the rotating louver door towards the opposite proximal end 72 of the link, which decreases the link length from the first length A to a minimum length B along the toggle line 80, and then the link increases in length to a larger second length C when the forward louver door is fully deployed. The length of the toggle link when aligned along the toggle line 80 is the minimum length of the toggle link since the louver door rotates about the hinge joint 70 which carries the link distal end 74 along a small arc therearound.

This configuration and orientation of the toggle links 68 illustrated in FIG. 8 may be used to provide a substantial reaction force F on the outboard side of the toggle link 80 which in turn creates a counterclockwise closing moment or couple M1 for maintaining closed the forward louver door in its stowed position. The toggle link 68 is thusly toggled-on in its outboard position illustrated in FIG. 8 for developing the counterclockwise moment M1.

In contrast, when the forward toggle link 68 is toggled inboard of its toggle line 80 as illustrated in FIG. 6 to its toggle-off position, a corresponding reaction force is developed in the toggle link which in turn creates a clockwise opening moment or couple M2 which assists the drive actuator in maintaining open in the deployed position the forward louver door.

In either on or off position of the forward toggle link 68, the drive actuator 62 must be energized for deploying open the forward louver door or stowing closed the forward louver door while also compressing the forward toggle link 68 to its minimum length B as it toggles between the opposite sides of the toggle line 80. In either position on opposite sides of the toggle line, the compressed toggle link 68 is offset or over-center and develops the reaction force F and the corresponding clockwise or counterclockwise moments exerted on the forward louver door.

In the preferred embodiment illustrated in FIG. 8, the kinematic geometry of the rotating louver door and rotating forward toggle link are selected so that the second or toggle-off length C of the forward toggle link 68 is smaller than the first or toggle-on length A of the forward toggle link so that the clockwise deploying moment M2 is greater than the counterclockwise stowing moment M1. The force requirements for the corresponding drive actuator 62 may therefore complement the forces and moments developed by the forward toggle link 68.

Figure 10:
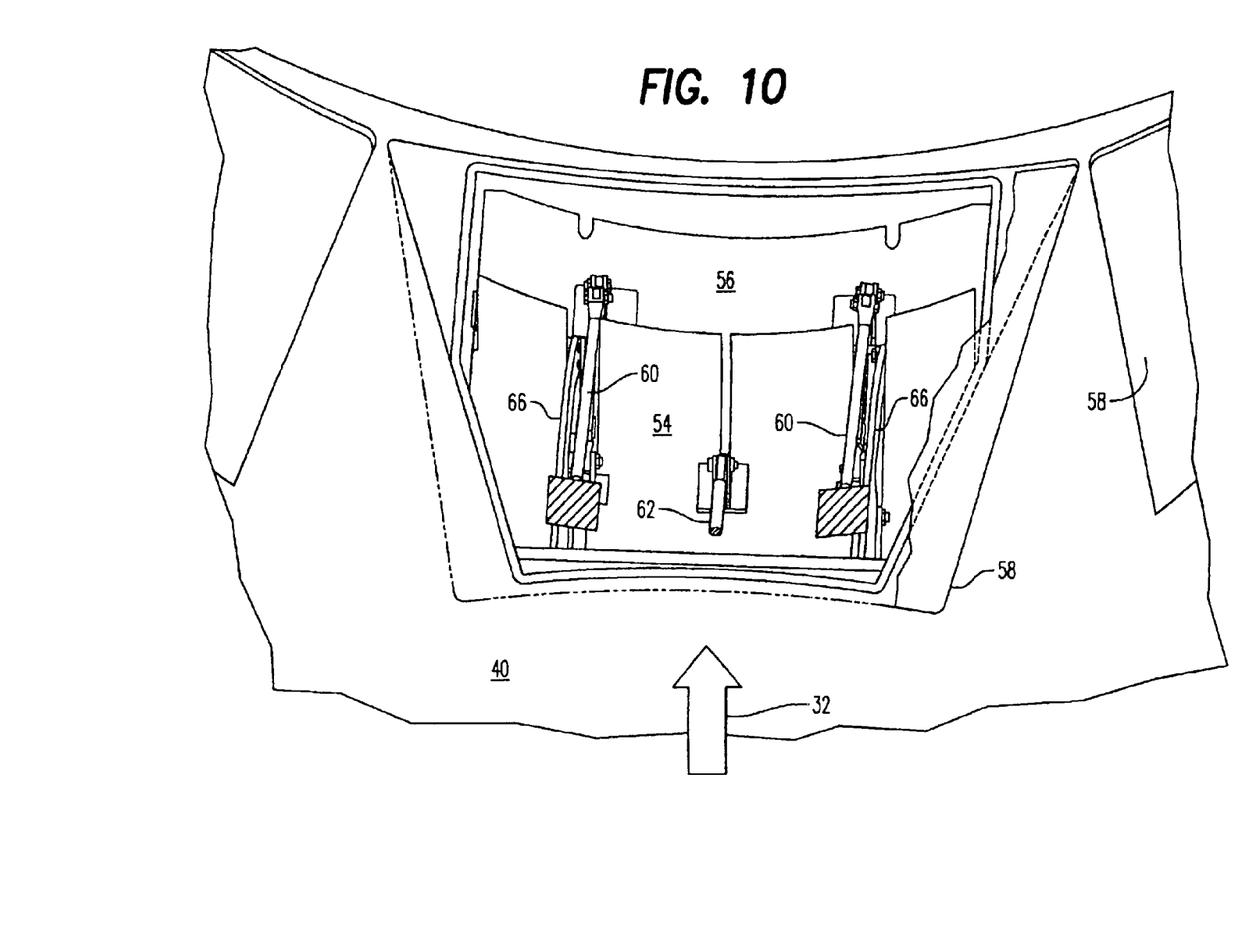
FIG. 10 is a radially outwardly facing planiform view of a portion of the fan reverser illustrated in FIG. 5 and taken generally along line 10—10.
Figure 11:
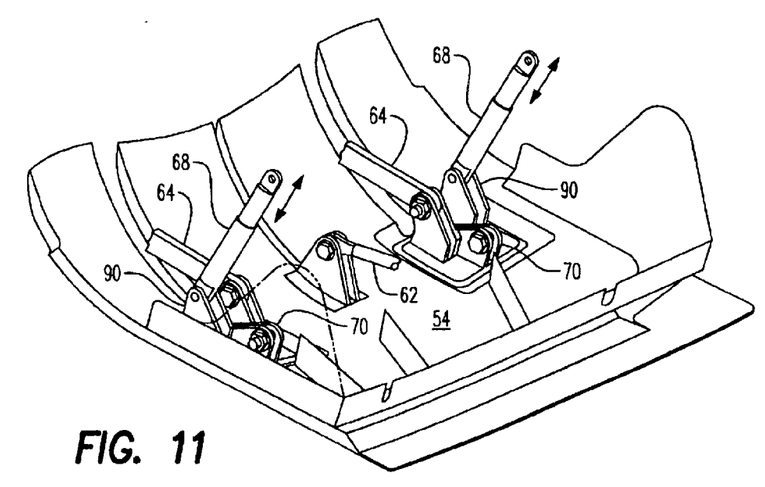
FIG. 11 is an isolated isometric view of the forward outer door of the fan reverser illustrated in FIG. 5.

FIG. 10 illustrates the inside view of the aft portion of the forward louver door 54, with FIG. 11 illustrating the forward louver door 54 in isolation. FIG. 11 illustrates clearly a pair of the forward toggle links 68 pivotally joined to the inboard side of the forward louver door 54 at corresponding devises 90 provided therefor.

Figure 12:
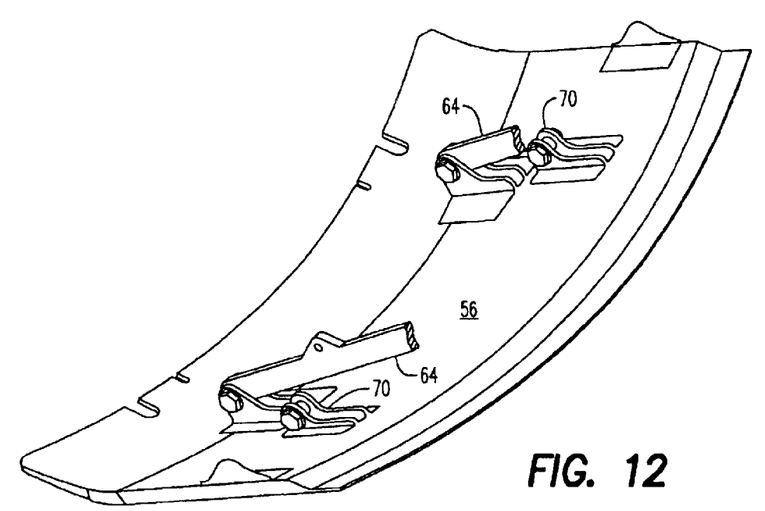
FIG. 12 is an inboard isometric view of the aft outer door of the fan reverser illustrated in FIG. 5.
Figure 13:
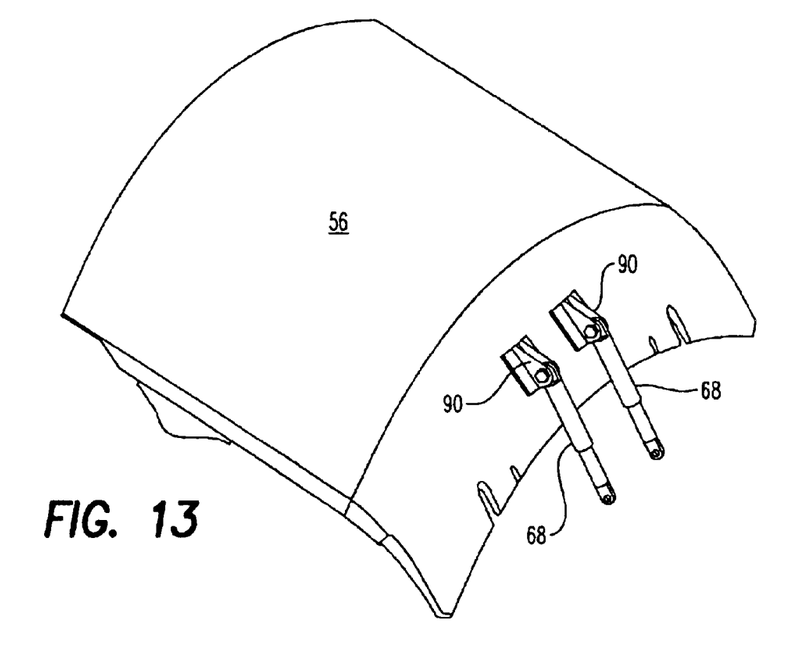
FIG. 13 is an outboard isometric view of the aft outer door of the fan reverser illustrated in FIG. 5.

As illustrated in FIGS. 7 and 12, the aft louver door 56 includes a pair of the hinge joints 70 defined by suitable devises joined to the inboard side thereof. Correspondingly, FIGS. 7 and 13 illustrate a pair of the aft toggle links 68 pivotally joined to the outboard side of the aft louver door 56 in suitable devises 90 substantially identical to those used for the forward toggle links.

The aft toggle link 68 illustrated in FIGS. 5 and 6 functions in the same manner as the forward toggle link 68, but is sized and oriented differently for cooperating with the aft louver door 56. For example, the distal end of the aft toggle link 68 illustrated in FIG. 5 is disposed radially outboard of the aft toggle line 80 in the stowed position of the aft louver door, and radially inboard of the aft toggle line in the deployed position of the aft louver door as illustrated in FIG. 6.

Correspondingly, the aft toggle link 68 illustrated in FIG. 5 has a first length D in the stowed position which decreases to its minimum length along the aft toggle link 80 as the aft louver door is deployed, and then increases to the second length E when the aft louver door is fully deployed.

The aft toggle link 68, like the forward toggle link described above, effects a reaction force as the toggle link is compressed for generating a counterclockwise moment in FIG. 5 for maintaining closed the aft louver door, and a clockwise moment in FIG. 6 for maintaining open the aft louver door when deployed. The deployed length E of the aft toggle link 68 may be smaller than the stowed length D thereof, for effecting greater deploying moment than stowing moment.

Accordingly, the forward toggle link 68 may be used with the forward louver door 54. The aft toggle link 68 may be used with the aft louver door 56. And, the forward and aft toggle links may be used solely on either of the two louver doors, or on both the louver doors as illustrated in FIG. 7 for example.

As indicated above, the two louver doors 54,56 cooperate with the inner blocker door 58 using the corresponding drive links 60 therebetween. Each of the two louver doors 54,56 as disclosed above may be independently locked or latched using the corresponding toggle link 68 actuated by the common drive actuator 62 which rotates open or closed the louver and blocker doors.

Figure 14:
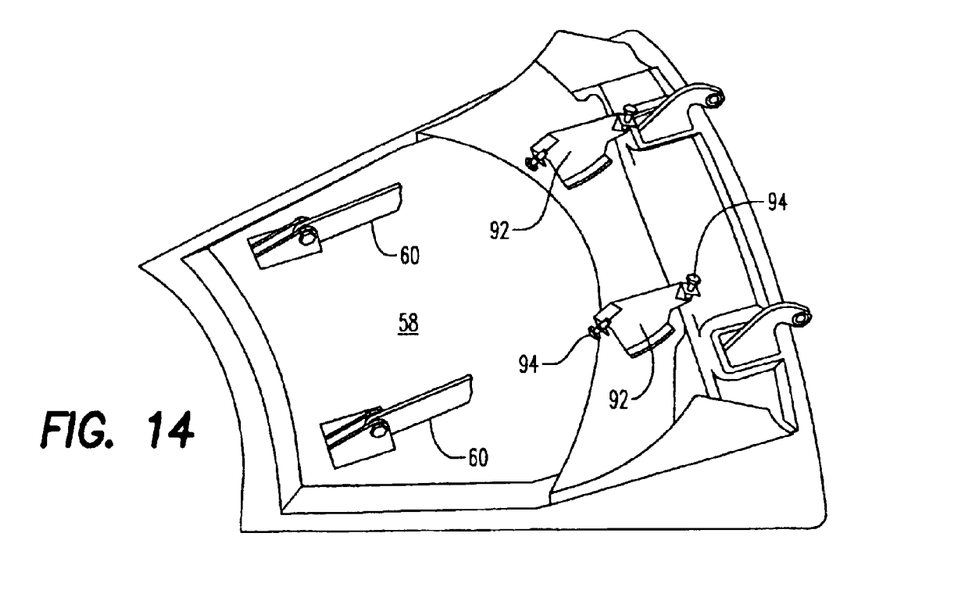
FIG. 14 is an isolated isometric view of the inner blocker door of the fan reverser illustrated in FIG. 5.

An additional level or redundancy to lock or latch the louver doors stowed may be provided by introducing an interlock bracket or plate 92 fixedly joined to the radially outer surface of the inner blocker door 58 as illustrated in FIGS. 5, 6, and 14. Preferably, a pair of the interlock brackets 92 are mounted on the blocker door 58 spaced laterally apart from each other for matching the paired configuration of the other components of the louver and blocker doors.

As shown in FIG. 5, the interlock bracket 92 is specifically configured for abutting contact with either or both outer louver doors 54,56 in the stowed positions thereof for interlocking the louver and blocker doors in their stowed positions. In this way, the common inner blocker door 58 itself may be used for additionally locking the doors in their stowed positions.

The interlock bracket 92 is best illustrated in FIG. 7 and is preferably disposed at the aft end of the inner door 58 to correspondingly abut the aft ends of both outer louver doors 54,56 when stowed.

Each interlock bracket 92 is in the form a thin vertical plate having axially forward and aft flanges in which corresponding adjustable stop pins 94 are suitably mounted. For example, the stop pins 94 may be in the form of threaded bolts mounted in threaded apertures in the flanges for adjusting their corresponding heights.

As shown in FIG. 7, the forward stop pin 94 has a head oriented to abut the outer side or surface of the forward louver door 54 near its trailing edge when stowed. Correspondingly, the aft stop pin 94 has a head oriented to abut the inner side or surface of the aft louver door 56 near its trailing edge when stowed.

Both aft ends of the two louver doors 54,56 are curved radially inwardly and spaced apart on opposite sides of the interlock bracket 92. The bracket 92 may therefore be suitably configured for mounting the forward and aft stop pins 94 closely adjacent to the corresponding portions of the two louver doors for abutting contact therewith when the two louver doors are stowed.

In FIGS. 5 and 7, the common inner blocker door 58 is closed in its stowed position, with in turn positions the interlock bracket 92 between the aft ends of the two louver doors so that the two stop pins 94 contact the two louver doors. This contact prevents the aft louver door 56 from being deployed, and prevents the inner blocker door 58 from being deployed, and in turn interlocks all three doors 54,56, 58 together by the interlock bracket 92 itself, which is in addition to the interlocking of the same three doors provided by the unison links 64 and drive links 60.

When the drive actuator 62 is retracted as illustrated in FIG. 6, the louver doors and blocker door are simultaneously deployed which disengages the interlock bracket 92 from the two louver doors to permit deployment of all three doors.

Like the forward and aft toggle links 68 described above, the interlock bracket 92 may be used with either louver door 54,56 or both louver doors. The interlock bracket 92 may include the forward stop pin 94 as illustrated in FIG. 7 for abutting the forward louver door 54 in the stowed position, or may include the aft pin 94 abutting the aft louver door 56 in the stowed position, or may include both forward and aft stop pins 94 for additionally interlocking all three doors 54–58 together.

The interlock bracket 92, like the toggle links 68, disclosed above provides additional locking or latching of the interconnected louver and blocker doors independently of the drive actuator 62 and associated links 60,64. The drive actuator and its links not only control deployment and stowing of the several doors, but also provide the primary active mechanism for locking closed those doors to prevent inadvertent deployment thereof when not intended, except for landing of the aircraft.

However, in the event of any failure in the drive actuator 62 or links 60,64, or in the control system therefor, the toggle links 68 and interlock bracket may still be used to provide additional and redundant locking mechanisms for the several doors to prevent their inadvertent deployment. The forward toggle link 68 provides one level of redundancy for locking closed the forward louver door, which in turn locks closed the aft louver door and blocker door by the interconnected links 60,64.

The aft toggle link provides another level of locking redundancy for the aft louver door 56, and in turn the forward louver door and blocker door interconnected by the links 60,64.

And, the interlock bracket 92 provides yet further levels of locking redundancy with the aft stop pin locking closed the aft louver door, and the forward stop pin locking closed the cooperating blocker door, with all three doors being interlocked closed together.

These multiple levels of locking redundancy are all passive and simply effected upon initial stowing closed of the several louver and blocker doors as initially driven by the drive actuator 62. That drive actuator generates sufficient force for not only deploying open the several doors but also overcoming the reaction force in the toggle links as they are compressed to toggle past their corresponding toggle lines during deployment. The interlock bracket 92 itself is simply freed from abutting contact between the forward and aft louver doors as the three doors are simultaneously driven open.

Figure 15:
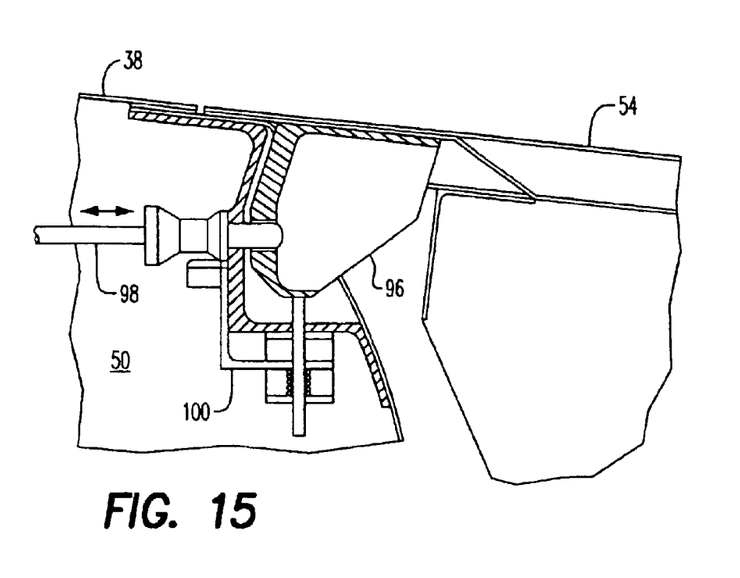
FIG. 15 is an enlarged axial sectional view of an additional locking mechanism for the forward outer door stowed closed in the fan reverser illustrated in FIG. 5.
Figure 16:
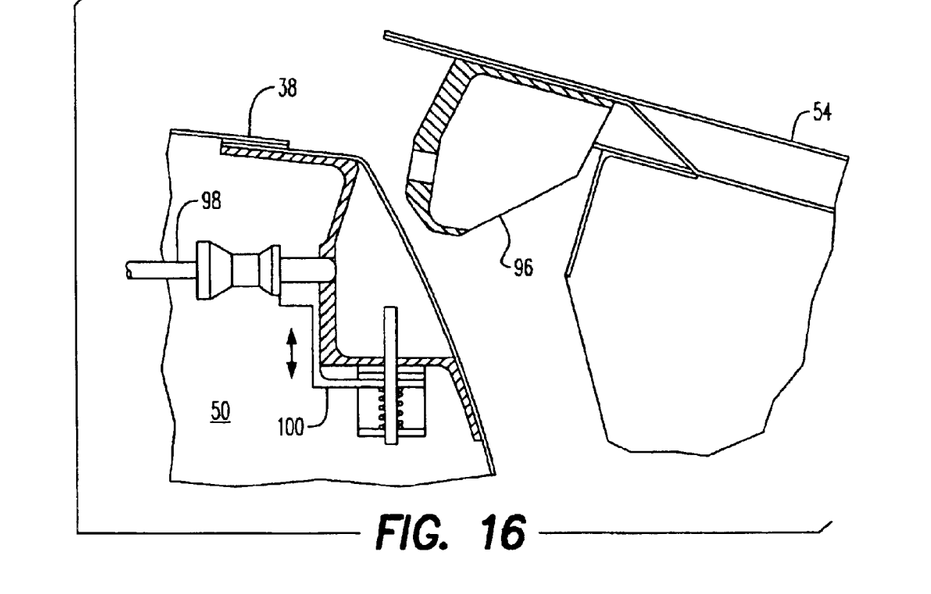
FIG. 16 is an enlarged axial sectional view, like FIG. 15, of the locking mechanism as the forward outer door is deployed open.

FIGS. 5 and 15 illustrate an exemplary embodiment of additional means for actively locking closed the outer and inner doors 54–58 in their stowed position, with FIGS. 6 and 16 illustrating unlocking of the doors during deployment. As best shown in FIG. 15, the locking means include a locking bracket or tab 96 fixedly mounted inside the forward end of the forward louver door 54. A locking actuator 98 is fixedly mounted inside the nacelle and has an extendable rod aligned with the locking tab for engaging an aperture therein to lock closed the forward louver door 54 when stowed. Retraction of the actuator rod releases the locking tab 96 and permits deployment of the louver door.

The locking actuator 98 is independent of the drive actuator 62, and these actuators may have any conventional configurations such as electrical, hydraulic, or pneumatic with corresponding output rods that may be retracted or extended as desired.

As additionally shown in FIGS. 15 and 16, the locking means preferably also include a spring-loaded retainer 100 mounted to the nacelle adjacent the distal end of the output rod of the actuator. The retainer 100 provides many functions.

For example, the retainer 100 includes a corresponding bracket with an aperture therethrough in which the complementary tab 96 may nest as illustrated in FIG. 15 so that the distal end of the actuator rod 98 may fixedly lock the tab in the retainer.

As shown in FIG. 16, the distal end of the actuator rod includes an annular flange which may be captured by a corresponding tab that is spring-loaded in the retainer for retaining retracted the rod of the locking actuator when the doors are deployed open. In this way, the locking actuator may be de-energized while the retention tab prevents the actuator rod from extending into the retainer bracket. Preferably, the rod in the locking actuator 98 is spring-loaded to automatically extend when de-energized, so that upon retraction of the retention tab the rod can automatically extend.

The retainer 100 illustrated in FIG. 16 also includes a radial pin around which a compression spring is mounted, with the tab 96 including a corresponding land for depressing inwardly the spring-loaded pin as the blocker door is stowed. In this way, the retracting pin in turn retracts the retention tab for unlocking the actuator rod. The actuator rod may then be driven to re-engage the apertures in the retainer 100 and tab 96 as illustrated in FIG. 15 for locking the forward louver door.

For failsafe operation in the event of failure of the spring-loaded retainer 100, the tab 96 includes an inclined cam surface below the aperture therein configured for engaging the distal end of the spring-loaded actuator rod for self-retraction as the louver door is stowed.

Whereas the drive actuator 62 and the lock actuator 98 are both active devices which must be externally powered for locking closed the louver and blocker doors, the relatively simple toggle links and interlock bracket permit locking or latching of the interconnected louver and blocker doors in a simple and passive manner. The toggle links and interlock bracket use the louver doors and blocker door themselves in interlocking together these doors without the need for external power. Multiple levels of locking redundancy are provided, and correspondingly decrease the complexity of the required locking redundancy over that typically required for conventional fan thrust reversers.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which I claim:

1. A thrust reverser comprising:
   a nacelle having radially outer and inner skins extending axially from a leading edge defining an inlet to a trailing edge defining an outlet;
   an outer door disposed in said outer skin, and mounted to said nacelle at a hinge joint;
   a toggle link pivotally joined between said door and said nacelle for latching stowed said door in said nacelle; and
   means for rotating said door about said hinge joint for deploying said door outwardly from said nacelle and toggling off said toggle link, and stowing inwardly said door upon reverse rotation thereof and toggling on said toggle link.

2. A reverser according to claim 1 wherein said toggle link includes a proximal end pivotally joined to said nacelle away from hinge joint, with a toggle line extending therebetween, and an opposite distal end disposed between said proximal end and said hinge joint laterally offset from said toggle line.

3. A reverser according to claim 2 wherein said distal end of said toggle link is laterally offset outboard of said toggle line in a stowed position of said door, and laterally offset inboard of said toggle line in a deployed position of said door.

4. A reverser according to claim 3 wherein said toggle link is telescopic and requires increasing compression force as length between said proximal and distal ends thereof decreases.

5. A reverser according to claim 4 wherein said toggle link has a first length in said stowed position, and a smaller second length in said deployed position.

6. A reverser according to claim 4 wherein said toggle link is spring loaded in compression between said proximal and distal ends thereof.

7. A reverser according to claim 4 wherein said toggle link is pivotally joined to an inboard side of said door.

8. A reverser according to claim 4 wherein said toggle link is pivotally joined to an outboard side of said door.

9. A reverser according to claim 4 further comprising:
   an inner door pivotally mounted to said nacelle in said inner skin in opposition to said outer door;
   a drive link pivotally joining together said outer and inner doors for simultaneous deployment by said rotating means; and an interlock bracket joined to said inner door in abutting contact with said outer door in said stowed position for interlocking said inner and outer doors in said stowed position.

10. A reverser according to claim 9 wherein said interlock bracket is disposed at an aft end of said inner door to abut an aft end of said outer door.

11. A reverser according to claim 9 wherein said interlock bracket includes an adjustable stop pin for abutting said outer door.

12. A reverser according to claim 9 further comprising:

a pair of said outer doors disposed in axial alignment in said outer skin atop said inner door, with both outer doors having respective hinge joints in said nacelle;

a unison link pivotally joining together said pair of outer doors; and said drive link pivotally joining together said outer door pair and said inner door for deploying outwardly in unison said outer doors as said inner door is deployed inwardly.

13. A reverser according to claim 12 wherein said toggle link is pivotally joined between said nacelle and a forward one of said outer doors.

14. A reverser according to claim 12 wherein said toggle link is pivotally joined between said nacelle and an aft one of said outer doors.

15. A reverser according to claim 12 wherein each of said outer doors includes a respective toggle link pivotally joined to said nacelle.

16. A reverser according to claim 12 wherein said interlock bracket is fixedly joined to said inner door in abutting contact with a forward one of said outer doors.

17. A reverser according to claim 12 wherein said interlock bracket is fixedly joined to said inner door in abutting contact with an aft one of said outer doors.

18. A reverser according to claim 12 wherein said interlock bracket is fixedly joined to said inner door in abutting contact with both of said outer doors.

19. A reverser according to claim 12 wherein:

each of said outer doors includes a respective toggle link pivotally joined to said nacelle; and said interlock bracket is fixedly joined to said inner door in abutting contact with both of said outer doors.

20. A reverser according to claim 19 wherein:

a forward one of said outer doors includes a forward toggle link pivotally joined to an inboard side of said forward outer door; and an aft one of said outer doors includes an aft toggle link pivotally joined to an outboard side of said aft outer door.

21. A reverser according to claim 20 wherein said interlock bracket includes a forward adjustable stop pin for abutting an outer side of said forward door, and an aft adjustable stop pin for abutting an inner side of said aft outer door.

22. A reverser according to claim 21 further comprising means for selectively locking closed said forward outer door to said nacelle.

* * * * *